US012015907B2

(12) United States Patent
Yamaguchi

(10) Patent No.: US 12,015,907 B2
(45) Date of Patent: Jun. 18, 2024

(54) TRANSMISSION APPARATUS, RECEPTION APPARATUS, AND ACOUSTIC SYSTEM

(71) Applicant: Sony Group Corporation, Tokyo (JP)

(72) Inventor: Takeshi Yamaguchi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 138 days.

(21) Appl. No.: 17/764,355

(22) PCT Filed: Mar. 3, 2020

(86) PCT No.: PCT/JP2020/008896
§ 371 (c)(1),
(2) Date: Mar. 28, 2022

(87) PCT Pub. No.: WO2021/065031
PCT Pub. Date: Apr. 8, 2021

(65) Prior Publication Data

US 2022/0337967 A1 Oct. 20, 2022

(30) Foreign Application Priority Data

Oct. 1, 2019 (JP) ................................. 2019-181456

(51) Int. Cl.

| | |
|---|---|
| ***H04R 5/02*** | (2006.01) |
| ***H04S 3/00*** | (2006.01) |
| ***H04S 7/00*** | (2006.01) |
| *H04H 20/49* | (2008.01) |

(52) U.S. Cl.
CPC ................ *H04S 7/30* (2013.01); *H04S 3/008* (2013.01); *H04S 2400/01* (2013.01); *H04S 2400/11* (2013.01); *H04S 2400/13* (2013.01)

(58) Field of Classification Search
CPC ........ H04S 7/30; H04S 3/008; H04S 2400/01; H04S 2400/11; H04S 2400/13
USPC .................................................... 381/303, 16
See application file for complete search history.

(56) References Cited

U.S. PATENT DOCUMENTS

| | | | | |
|---|---|---|---|---|
| 11,412,177 | B1 * | 8/2022 | Kuo | H04N 5/0736 |
| 2006/0274905 | A1 | 12/2006 | Lindahl | |
| 2009/0024235 | A1 | 1/2009 | Kim | |
| 2018/0061130 | A1 | 3/2018 | Wojdala | |
| 2020/0169233 | A1 * | 5/2020 | Baumgarte | H03G 3/20 |

FOREIGN PATENT DOCUMENTS

| | | | | |
|---|---|---|---|---|
| EP | 1087377 | A | 3/2001 | |
| EP | 1087377 | A1 * | 3/2001 | G10L 19/018 |
| EP | 1592008 | A2 | 11/2005 | |
| EP | 2133871 | A1 | 12/2009 | |
| EP | 2312763 | A1 | 4/2011 | |

(Continued)

OTHER PUBLICATIONS

International Search Report (PCT/ISA/210), International Application No. PCT/JP2020/008896, dated May 15, 2020.

*Primary Examiner* — Ammar T Hamid
(74) *Attorney, Agent, or Firm* — Michael Best & Friedrich LLP

(57) ABSTRACT

A transmission apparatus includes a first transmission unit that transmits sound data to a first sound channel in a transmission path, and a second transmission unit that transmits meta data related to the sound data to a second sound channel in the transmission path while ensuring synchronization with the sound data.

17 Claims, 7 Drawing Sheets

(56) References Cited

FOREIGN PATENT DOCUMENTS

| | | | | |
|---|---|---|---|---|
| EP | 3301673 | A1 | 4/2018 | |
| JP | H07015458 | A | 1/1995 | |
| JP | 2005167612 | A | 6/2005 | |
| JP | 2009239722 | A | 10/2009 | |
| JP | 4470322 | B2 | 6/2010 | |
| WO | WO-2008114432 | A1 | 9/2008 | |
| WO | 2018093690 | A1 | 5/2018 | |
| WO | WO-2018093690 | A1 * | 5/2018 | ........... G10L 19/008 |

* cited by examiner

[Fig. 5]
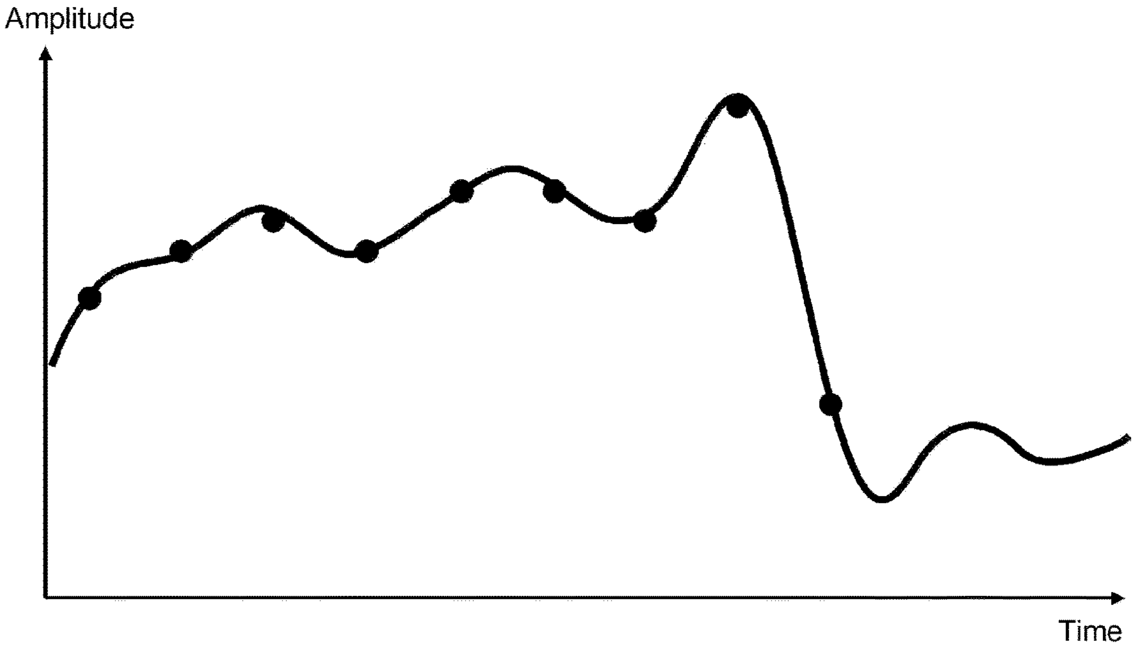
[Fig. 6]
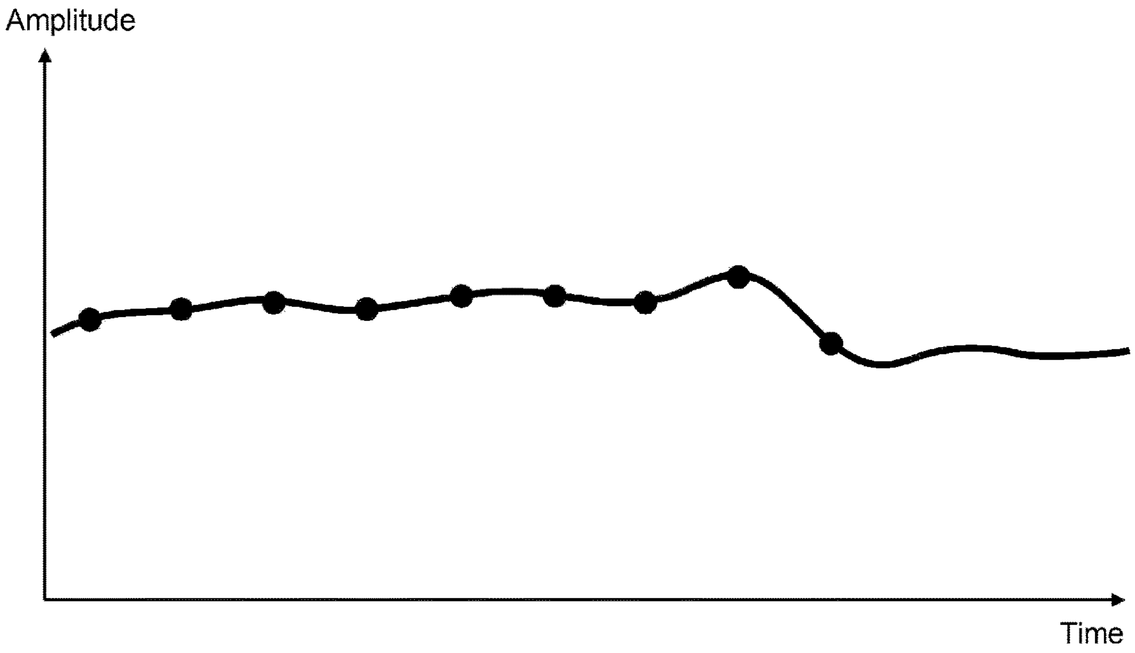

[Fig. 8]
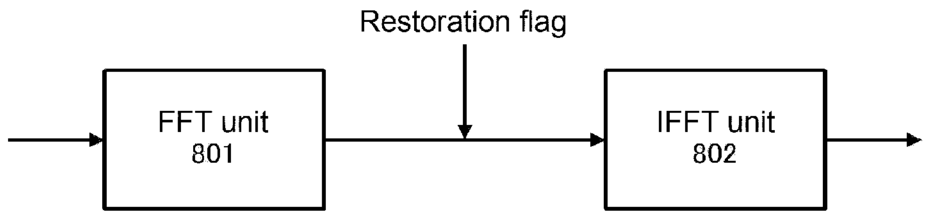
[Fig. 9]
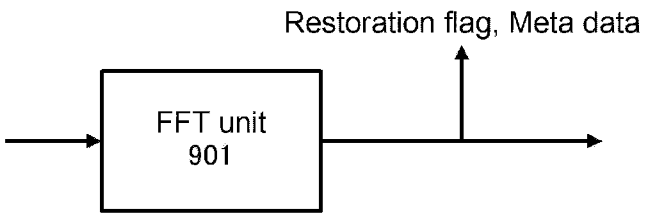

TRANSMISSION APPARATUS, RECEPTION APPARATUS, AND ACOUSTIC SYSTEM

CROSS REFERENCE TO RELATED APPLICATIONS

This application claims the benefit of Japanese Priority Patent Application JP 2019-181456 filed Oct. 1, 2019, the entire contents of which are incorporated herein by reference.

TECHNICAL FIELD

The technology disclosed in the present specification relates to a transmission apparatus that transmits sound data and meta data, a reception apparatus that receives sound data and meta data, and an acoustic system.

BACKGROUND ART

Acoustic systems using a plurality of speakers such as array speakers are becoming pervasive. The reproduction of a sound signal using a plurality of output channels allows sound localization. Further, an increase in the number of channels and the multiplexing of speakers make it possible to control a sound field with higher resolution. In such cases, the output content of a sound has to be calculated for each of output channels on the basis of sound data corresponding to the number of sound sources and position information regarding the respective sound sources (see, for example, Patent Literature 1). However, an increase in the number of channels (for example, 192 channels) makes the calculation amounts of output sounds enormous as described above and makes real time processing at one spot (or with a single apparatus) difficult.

In view of this, a distributed acoustic system is assumed in which a multiplicity of output channels is divided into some sub-systems, a master apparatus distributes the sound data of all sound sources and position information regarding the respective sound sources to the respective sub-systems, and the sub-systems perform the calculation of output sounds with respect to individual handling output channels.

For example, the master apparatus transfers sound data for each reproduction time via a transmission path based on a common standard such as a MIDI (Musical Instrument Digital Interface). As a result, the respective sub-systems are allowed to receive the sound data synchronously. On the other hand, when position information regarding respective sound sources is tried to be transferred from the master apparatus to the respective sub-systems using another transmission path such as a LAN (Local Area Network), it is difficult for the sub-systems to ensure the synchronization between the received sound and the position information even if the master apparatus transmits the position information in synchronization with the sound data for each reproduction time. As a result, the realization of sound field control with higher resolution becomes difficult. Since a transmission delay is undefined when a network such as a LAN is used, the sub-systems have a difficulty in compensating for or eliminating the transmission delay.

Further, when sound data is transferred using a MIDI, both the transmission and reception sides (the master apparatus and the respective sub-systems in this case) have to prepare for mechanical equipment and materials equipped with a MIDI. General information apparatuses such as personal computers are assumed to be used as the subsystems. However, such apparatuses are not typically equipped with mechanical equipment and materials for a MIDI.

CITATION LIST

Patent Literature

PTL 1: Japanese Patent Application Laid-open No. 2005-167612

PTL 2: Japanese Patent Application Laid-open No. 7-15458

SUMMARY

Technical Problem

There is a need to provide a transmission apparatus that transmits meta data while ensuring synchronization with sound data, a reception apparatus that receives meta data synchronized with sound data, and an acoustic system.

Solution to Problem

A first embodiment of the technology disclosed in the present specification provides a transmission apparatus including:

- a first transmission unit that transmits sound data to a first sound channel in a transmission path; and
- a second transmission unit that transmits meta data related to the sound data to a second sound channel in the transmission path while ensuring synchronization with the sound data.

The meta data may include position information regarding a sound source of the sound data and include at least one of area information for specifying a specific area of a sound source of the sound data, a frequency or a gain used in waveform equalization or other effectors, or an attack time.

Further, a second embodiment of the technology disclosed in the present specification provides a reception apparatus including:

- a first reception unit that receives sound data from a first sound channel in a transmission path; and
- a second reception unit that receives meta data synchronized with the sound data from a second sound channel in the transmission path.

The reception apparatus according to the second embodiment further includes: a processing unit that processes the sound data using the synchronized meta data. Further, the meta data includes position information regarding a sound source of the sound data, and the processing unit performs sound field reproduction processing with respect to the sound data using the position information.

Further, a third embodiment of the technology disclosed in the present specification provides an acoustic system including:

- a transmission apparatus that transmits sound data to a first sound channel in a transmission path and transmits meta data related to the sound data to a second sound channel in the transmission path while ensuring synchronization with the sound data; and
- a reception apparatus that receives the sound data from the first sound channel and the meta data synchronized with the sound data from the second sound channel and processes the sound data using the meta data.

Advantageous Effects of Invention

However, the “system”” mentioned here refers to an object in which a plurality of apparatuses (or function modules that realize a specific function) is logically integrated together, and it does not matter whether the respective apparatuses or the function modules are provided inside a single housing.

The technology disclosed in the present specification makes it possible to provide a transmission apparatus that transmits meta data while ensuring synchronization with sound data via a transmission path including a plurality of sound channels, a reception apparatus that receives meta data synchronized with sound data via a transmission path including a plurality of sound channels, and an acoustic system.

Note that the effect described in the present specification is given only for an example, and an effect provided by the technology disclosed in the present specification is not limited to this. Further, the technology disclosed in the present specification may produce further additional effects other than the effect described above.

Other purposes, features, or advantages of the technology disclosed in the present specification will become apparent with a further detailed description based on an embodiment that will be described later and the attached drawings.

BRIEF DESCRIPTION OF DRAWINGS

FIG. 5 is a graph showing a signal waveform example of meta data that has been subjected to gain control.

FIG. 6 is a graph showing a signal waveform example of meta data that has been subjected to gain control.

FIG. 8 is a diagram showing a configuration example of transmitting meta data on a spectrum.

FIG. 9 is a diagram showing a configuration example of receiving meta data transmitted on a spectrum.

DESCRIPTION OF EMBODIMENTS

Hereinafter, an embodiment of the technology disclosed in the present specification will be described in detail with reference to the drawings.

A. System Configuration

Figure 1:
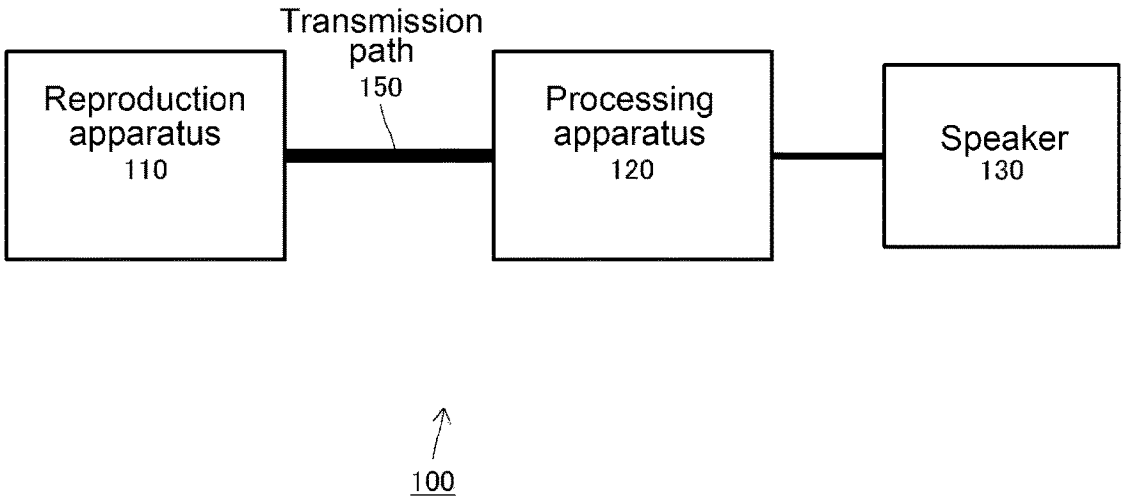
FIG. 1 is a diagram showing a configuration example of an acoustic system 100.

FIG. 1 schematically shows a configuration example of an acoustic system 100 to which the technology disclosed in the present specification is applied. The acoustic system 100 shown in the figure includes a reproduction apparatus 110, a processing apparatus 120, and a speaker 130.

The reproduction apparatus 110 reproduces sound data. The reproduction apparatus 110 is, for example, an apparatus that reproduces sound data from a recording medium such as a disc and a tape. Alternatively, the reproduction apparatus 110 includes an apparatus that receives a broadcast signal to reproduce sound data or reproduces sound data from a sound stream received via a network such as the Internet. In the present embodiment, the reproduction apparatus 110 reproduces sound data on time, and offers meta data accompanying the sound data in accordance with the time of the sound data or reproduces the meta data in accordance with a time as registered in advance. Then, the reproduction apparatus 110 outputs the reproduced sound data and meta data to the processing apparatus 120.

The processing apparatus 120 performs signal processing on sound data output from the reproduction apparatus 110 to be acoustically output from the speaker 130. Meta data may be used to perform the signal processing on the sound data. Then, the processing apparatus 120 delivers the sound data having undergone the signal processing to the speaker 130, and a listener (not shown) listens to a sound output from the speaker 130. Note that the speaker 130 connected to the processing apparatus 120 may be a multichannel speaker such as a speaker array but only a single speaker is shown here for the simplification of the drawing.

The signal processing of the sound data performed by the processing apparatus 120 includes sound field reproduction. For example, when the sound data received from the reproduction apparatus 110 includes the sounds of a plurality of sound sources (hereinafter also called "objects"), the processing apparatus 120 performs the signal processing on the sound data on the basis of position information regarding the respective objects so that the sounds of the respective objects output from the speaker 130 are heard as if they were emitted from positions corresponding to the respective objects.

In order to perform the sound field reproduction, the reproduction apparatus 110 puts the position information regarding the respective objects in the meta data to be transmitted.

The meta data such as the position information regarding the respective objects has to have isochronism with the sound data. This is because the processing apparatus 120 is not allowed to perform the sound field reproduction if the position information regarding the objects is delivered to the processing apparatus 120 behind the sound data. If the reproduction apparatus 110 and the processing apparatus 120 are physically arranged inside a single apparatus, it is easy to transmit the sound data and the meta data while ensuring their isochronism. However, if the reproduction apparatus 110 and the processing apparatus 120 are configured as physically-separated apparatuses, it is difficult to transmit the sound data and the meta data while ensuring their isochronism. For example, if a load on the signal processing of the sound data increases due to the multichannel (for example, 192 channels) of the speaker 130 or the like (that will be described later), it is assumed that the reproduction apparatus 110 and the processing apparatus 120 are configured as physically-separated apparatuses.

Here, a method for transmitting sound data and meta data between the reproduction apparatus 110 and the processing apparatus 120 will be studied.

A MIDI (Musical Instrument Digital Interface) for exchanging performance data between a computer and an electronic instrument has been known. General information apparatuses such as personal computers are assumed to be used as the reproduction apparatus 110 and the processing apparatus 120 but are not typically equipped with a MIDI. Therefore, mechanical equipment and materials equipped with a MIDI have to be prepared, which results in an increase in cost. If meta data is transmitted through another transmission path such as a LAN, it is difficult to retain isochronism with sound data. Particularly, in the case of a LAN, it is difficult to ensure the synchronization between sound data and meta data since a delay is undefined for each time.

Under such circumstances, the present specification will propose a technology to use an interface including a plurality of sound channels in a transmission path 150 between the reproduction apparatus 110 and the processing apparatus 120, handle meta data such as position information regarding respective objects as sound data, and transmit the meta data on any one of the sound channels.

For example, by transmitting the sound data of respective objects on individual sound channels and transmitting meta data on another channel, the reproduction apparatus 110 is allowed to deliver the meta data to the processing apparatus 120 while ensuring isochronism with the sound data. Further, by determining any of the sound channels on which the meta data is to be transmitted in advance between the reproduction apparatus 110 and the processing apparatus 120, the processing apparatus 120 is allowed to decode the meta data from data received on the sound channel and apply, to the sound data received on the other sound channels, processing, such as sound field reproduction, for which isochronism is necessary.

As one of interface standards including a plurality of sound channels, a MADI (Multichannel Audio Digital Interface) has been known (see, for example, Patent Literature 2). With a MADI, it is possible to bundle together AES/EBU (Audio Engineering Society/European Broadcasting Union) signals that use two channels in one system and biphase balance and transmit the audio signals of 64 channels at a maximum through one cable (an optical fiber or a coaxial cable). However, the transmission path 150 is not limited to a MADI interface and may transmit sound data and meta data in any of a digital format and an analog format.

Figure 2:
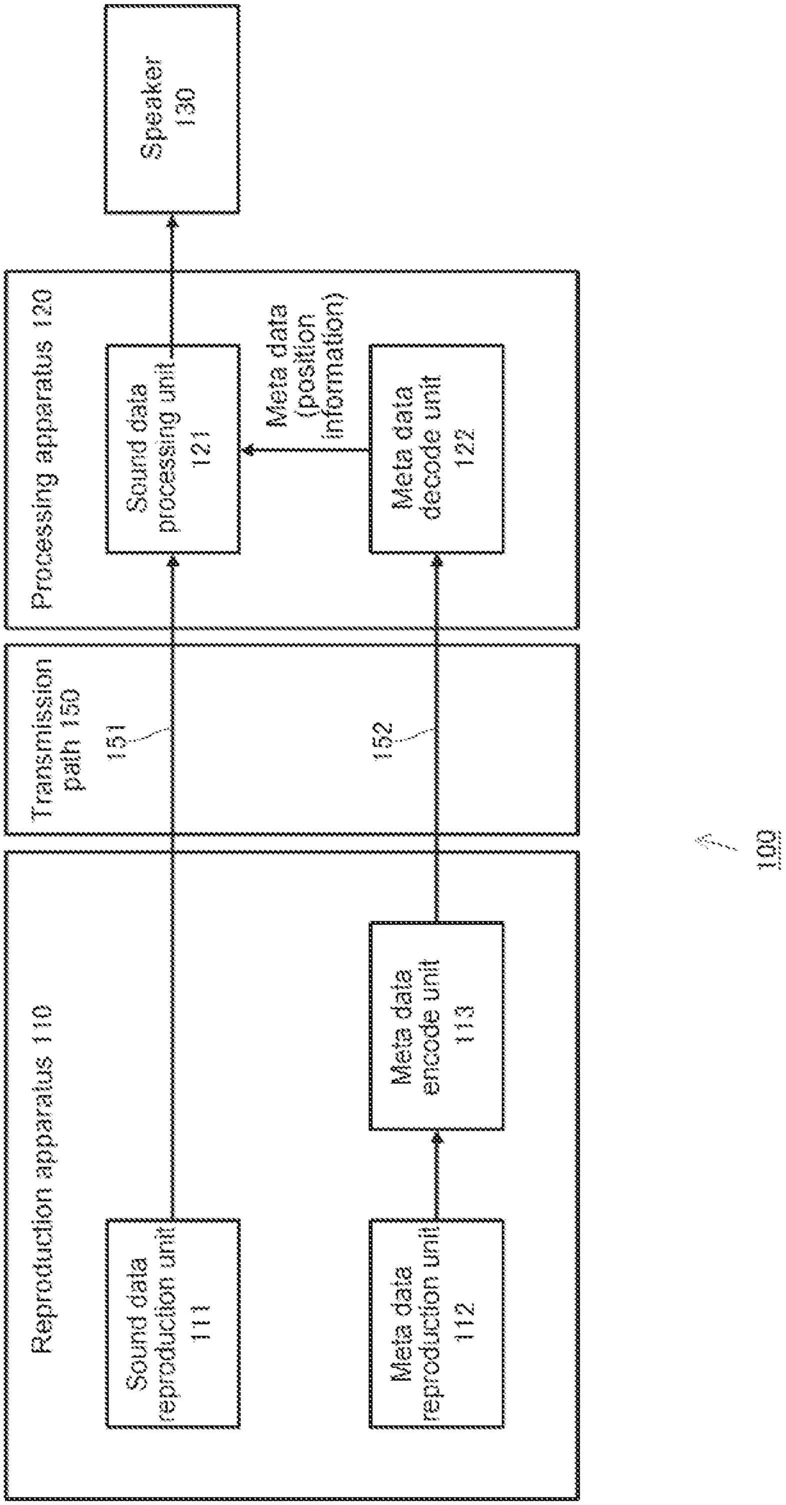
FIG. 2 is a diagram showing a configuration example of the acoustic system 100 using a transmission path 150 having multiple sound channels.

FIG. 2 schematically shows a configuration example of the acoustic system 100 in which the reproduction apparatus 110 and the processing apparatus 120 are connected to each other via the transmission path 150 having multiple sound channels.

The reproduction apparatus 110 includes a sound data reproduction unit 111, a meta data reproduction unit 112, and a meta data encode unit 113. The sound data reproduction unit 111 reproduces a piece of sound data for each of objects and delivers the respective pieces of sound data on individual sound channels 151 in the transmission path 150. It is assumed that the sound data reproduction unit 111 reproduces the sound data on time. The meta data reproduction unit 112 reproduces meta data accompanying the sound data for each of the objects. The meta data reproduction unit 112 offers the meta data in accordance with the time of the sound data or reproduces the meta data in accordance with a time as registered in advance.

In the present embodiment, the meta data reproduction unit 112 reproduces position information for each of the objects as the meta data. The meta data encode unit 113 encodes the reproduced meta data according to a prescribed transmission system. Then, the meta data encode unit 113 handles data, in which the position information items on the respective objects are coupled together in a time-axis direction in a prescribed order, as sound data and transmits the data on a sound channel 152 that is not used for the transmission of sound data. It is assumed that a sound channel on which the meta data is to be transmitted is determined in advance between the reproduction apparatus 110 and the processing apparatus 120. Then, the meta data encode unit 113 puts the position information regarding the plurality of objects on respective sample amplitudes in an order determined in advance on the sound channel 152 and transmits the same while ensuring the synchronization between the meta data and the sound data transmitted on the sound channel 151.

The processing apparatus 120 includes a sound data processing unit 121 and a meta data decode unit 122.

The sound data processing unit 121 processes the sound data for each of the objects transmitted on the individual sound channels in the transmission path 150. Further, the meta data decode unit 122 decodes the meta data transmitted on any of the sound channels not used for the transmission of the sound data and outputs the decoded meta data to the sound data processing unit 121.

The meta data that has been decoded by the meta data decode unit 122 includes the position information for each of the objects. Further, since the meta data is transmitted on another sound channel in the same transmission path 150 as the sound data, the position information for each of the objects ensures synchronization with the sound data of the respective objects.

The sound data processing unit 121 performs processing on the sound data of the respective objects on the basis of the meta data. For example, the sound data processing unit 121 performs, as sound field reproduction processing, signal processing on the sound data on the basis of the position information regarding the respective objects delivered from the meta data decode unit 122 so that the sounds of the respective objects output from the speaker 130 are heard as if they were emitted from positions corresponding to the respective objects.

In the present embodiment, the meta data is transmitted between the reproduction apparatus 110 and the processing apparatus 120 using another sound channel in the same transmission path 150 as the sound data. On this occasion, information is put on respective sample amplitudes, whereby the meta data is transmitted as if it were sound data. The content of data to be transmitted in the order of samples is determined in advance between the reproduction apparatus 110 and the processing apparatus 120. The determination is repeatedly performed for each of the sampling rates of the meta data and transmitted.

Figure 3:
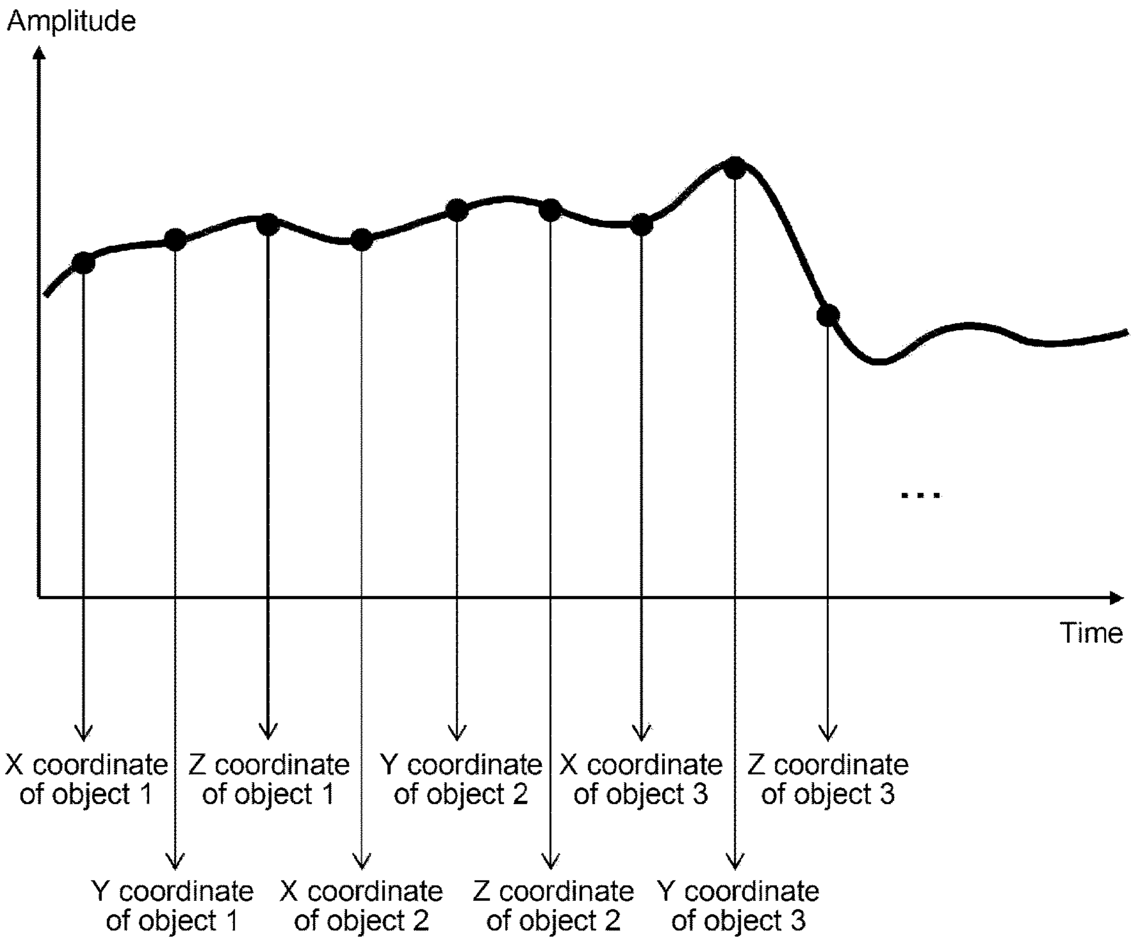
FIG. 3 is a graph showing a signal waveform example in a case in which three-dimensional position information regarding objects is transmitted on a sound channel.

FIG. 3 shows an example of a signal waveform in a case in which three-dimensional position information regarding three objects is transmitted on a sound channel as meta data. In the example shown in the figure, information is put on amplitudes in the order of the X coordinate of an object 1, the Y coordinate of the object 1, the Z coordinate of the object 1, the X coordinate of an object 2, etc., for each of sampling rates to be transmitted.

Then, the meta data encode unit 113 puts the position information regarding the plurality of objects on respective sample amplitudes in an order determined in advance on the sound channel 152 and transmits the same while ensuring the synchronization between the meta data and sound data transmitted on the sound channel 151.

The acoustic system 100 shown in FIG. 1 uses the transmission path 150 including a plurality of sound channels and transmits meta data on a sound channel while putting the same put on a sound stream. Accordingly, the acoustic system 100 eliminates the necessity to install a device or the like and is allowed to easily ensure the synchronization between the meta data and sound data.

Note that examples of the meta data of sound data may include various parameters used in sound processing. For example, besides position information regarding objects, parameters such as area information for specifying specific areas, frequencies or gains used in an effector such as waveform equalization, and attack times may be transmitted as meta data while being synchronized with sound data.

B. Modified Example

Figure 4:
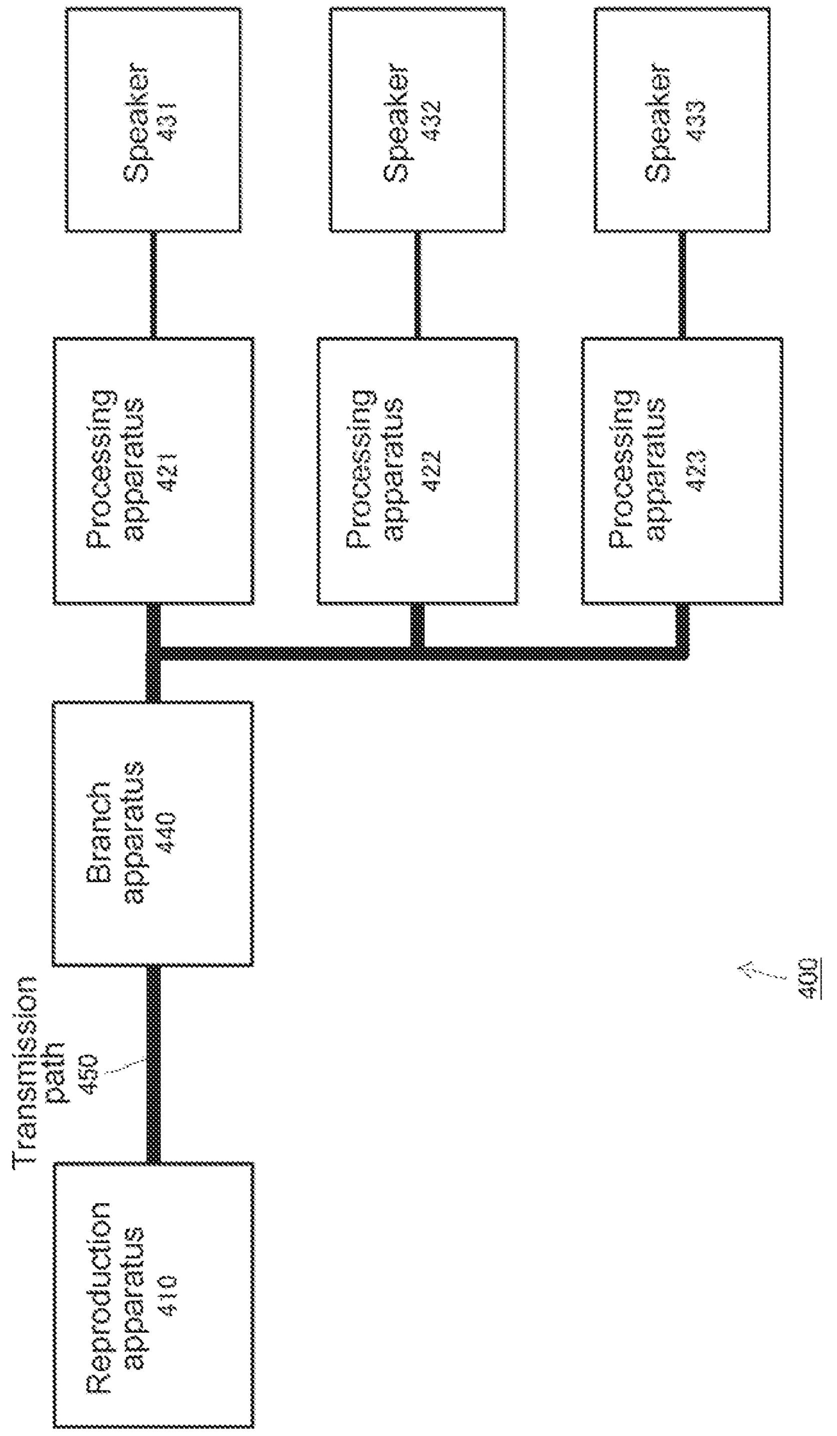
FIG. 4 is a diagram showing a configuration example of an acoustic system 400.

FIG. 4 schematically shows a configuration example of an acoustic system 400 according to a modified example. The acoustic system 400 shown in the figure includes one reproduction apparatus 410, a plurality of (three in the example shown in the figure) processing apparatuses 421 to 423 and speakers 431 to 433, and a branch apparatus 440 that distributes a signal output from the reproduction apparatus 410 to the respective processing apparatuses 421 to 423.

When the number of speakers increases, a load on the signal processing of sound data to be output to all the speakers increases, which makes it difficult to perform the processing with one apparatus. In view of this, the acoustic system 400 shown in FIG. 4 has the plurality of processing apparatuses 421 to 423 arranged in parallel and is configured to perform the processing of a sound signal that is to be output to the speakers 431 to 433 in a shared manner.

The reproduction apparatus 410 reproduces sound data. The reproduction apparatus 410 is, for example, an apparatus that reproduces sound data from a recording medium such as a disc and a tape. Alternatively, the reproduction apparatus 410 includes an apparatus that receives a broadcast signal to reproduce sound data or reproduces sound data from a sound stream received via a network such as the Internet. Further, the reproduction apparatus 410 reproduces sound data on time, and offers meta data accompanying the sound data in accordance with the time of the sound data or reproduces the meta data in accordance with a time as registered in advance.

Then, the reproduction apparatus 410 outputs the sound data and the meta data accompanying the sound data on different sound channels. As for the meta data, position information regarding a plurality of objects is put on respective sample amplitudes in an order determined in advance and transmitted while being synchronized with the sound data.

The branch apparatus 440 distributes an output signal from the reproduction apparatus 410 to the respective processing apparatuses 421 to 423. With the branch apparatus 440 disposed between the reproduction apparatus 410 and the respective processing apparatuses 421 to 423, the acoustic system 400 is allowed to transmit, like the case of the acoustic system 100 shown in FIG. 1, the sound data and the meta data to the respective processing apparatuses 421 to 423 in synchronization with each other. In the example shown in FIG. 4, the three processing apparatuses 421 to 423 are connected to the branch apparatus 440. However, the connection of four or more processing apparatuses is also possible, and extension such as an increase in the number of speakers is facilitated. Note that the branch apparatus 440 may perform processing such as waveform equalization with respect to a fluctuation in a transmission path when distributing the signal to the respective processing apparatuses 421 to 423.

The respective processing apparatuses 421 to 423 play basically the same role as the processing apparatus 120 in the acoustic system 100 shown in FIG. 1. That is, the respective processing apparatuses 421 to 423 perform signal processing on the sound data received from the reproduction apparatus 410 via the branch apparatus 440 to be acoustically output from the speakers 431 to 433 connected to the respective processing apparatuses 421 to 423. Meta data may be used to perform the signal processing on the sound data. Then, the processing apparatuses 421 to 423 deliver the sound data having undergone the signal processing to the speakers 431 to 433, and a listener (not shown) listens to sounds output from the respective speakers 431 to 433. Note that the respective speakers may be multichannel speakers such as speaker arrays but each of the speakers is shown only by a single speaker here for the simplification of the drawing.

The signal processing of the sound data performed by the respective processing apparatuses 421 to 423 includes sound field reproduction. For example, when the sound data received from the reproduction apparatus 410 includes the sounds of a plurality of sound sources (hereinafter also called "objects"), the respective processing apparatuses 421 to 423 perform the signal processing on the sound data on the basis of position information regarding the respective objects so that the sounds of the respective objects output from the speakers 431 to 433 connected to the respective processing apparatuses 421 to 423 are heard as if they were emitted from positions corresponding to the respective objects.

In order to perform the sound field reproduction, the reproduction apparatus 410 puts the position information regarding the respective objects in the meta data to be transmitted. As a transmission path 450 between the reproduction apparatus 410 and the branch apparatus 440 and between the branch apparatus 440 and the respective processing apparatuses 421 to 423, an interface including a plurality of sound channels is used. Further, by transmitting the sound data of the respective objects on individual sound channels and transmitting the meta data on another channel, the reproduction apparatus 410 is allowed to deliver the meta data to the respective processing apparatuses 421 to 423 while ensuring isochronism with the sound data.

The acoustic system 400 shown in FIG. 4 uses the transmission path 450 including a plurality of sound channels and transmits meta data on a sound channel while putting the same on a sound stream. Accordingly, the acoustic system 400 eliminates the necessity to install a device or the like and is allowed to easily ensure the synchronization between the meta data and sound data. Further, it is also possible to ensure the synchronization between the plurality of processing apparatuses 421 to 423.

C. Response to Change in Gain

The above description refers to a method for simply transmitting meta data on a sound channel in the acoustic system 100. Here, it is assumed that an output gain is changed on the side of the reproduction apparatus 110, an input gain is changed on the side of the processing apparatus 120, or a mixer (not shown) or the like is provided halfway through the transmission path 150 to perform gain control. The same applies to the acoustic system 400 shown in FIG. 4.

A transmission method in which meta data is put on respective sample amplitudes as shown in FIG. 3 causes a problem that the accurate transmission of the meta data is not allowed since the value of data put on the amplitudes changes when gain control is performed. Each of FIGS. 5 and 6 shows a result obtained when gain control is performed on the signal waveform of meta data transmitted on a sound channel as shown in the example of FIG. 3. For example, if the gain control is performed to double a gain when it is desired that meta data (1, 2, 3) be transmitted from the reproduction apparatus 110, the processing apparatus 120 receives meta data (2, 4, 6).

In view of this, a method for adding restoration flags right before respective pieces of information and transmitting meta data on a sound channel may be used. The restoration flags are flags for examining to what extent a volume (gain) is controlled or are flags for calibrating a change in metadata due to volume control.

Figure 7:
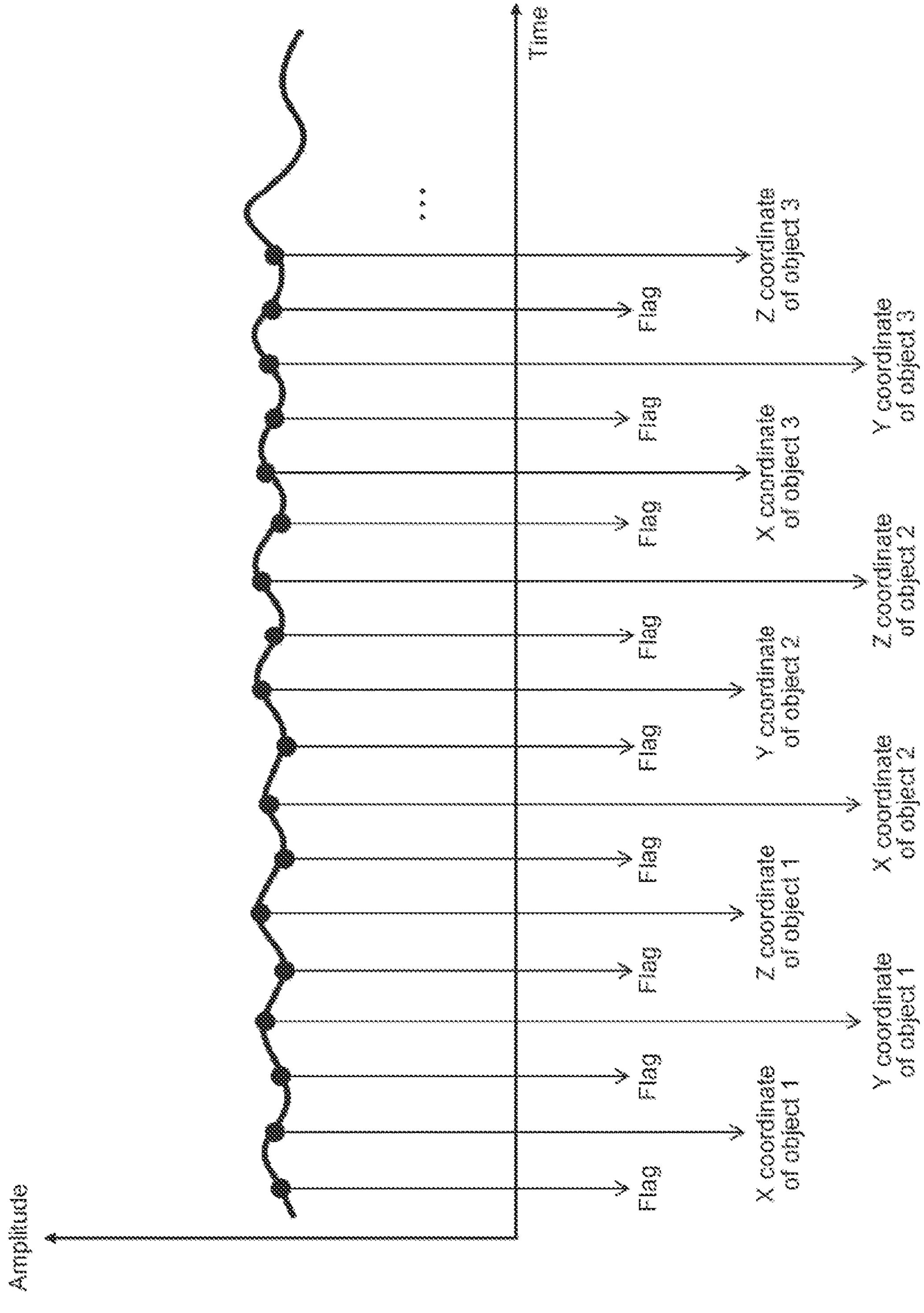
FIG. 7 is a graph showing a signal waveform example in a case in which meta data with restoration flags is transmitted on a sound channel.

FIG. 7 shows a signal waveform example of a sound channel that transmits meta data with restoration flags added right before respective pieces of information. As shown in the figure, restoration flags are added right before respective pieces of information. For example, when it is desired that the X coordinate of an object 1 be transmitted as 50, information with a flag (1.0, 50) is transmitted. When a gain is changed between the reproduction apparatus 110 and the processing apparatus 120 and the meta data is transmitted as information of which the amplitude is doubled, the processing apparatus 120 receives information (2.0, 100). In such a case, normalization is performed by the processing apparatus 120 to make the flag be 1.0, whereby it is possible to restore the X coordinate of the object 1 to the information 50.

The meta data restoration processing using flags as described above may be performed by, for example, the meta data decode unit 122.

As described above, restoration flags are added when meta data is transmitted on a sound channel, whereby the processing apparatus 120 is allowed to restore original information using the restoration flags even if a gain is changed halfway.

Note that since the situations as shown in FIGS. 5 and 6 are not caused if the mixer provided halfway through the transmission path 150 is configured so as not to perform gain control with respect to a sound channel for the transmission of meta data, there is no need to add the restoration flags. For example, a user may operate apparatus considering that gain control is not performed on a sound channel for the transmission of meta data.

D. Other Transmission Methods

A method in which information is put on amplitudes is described above as a method for transmitting meta data using a sound channel (see, for example FIG. 3). As another transmission method, a method in which meta data is transmitted on a spectrum may be used.

When transmitted on a spectrum, meta data may be transmitted in, for example, a mode in which a restoration flag is set at a band of 500 Hz, first information is set at a band of 1 kHz, second information is set at a band of 2 kHz, etc., to transmit the meta data. On this occasion, if the size of the restoration flag is determined in advance between the reproduction apparatus 110 and the processing apparatus 120, the processing apparatus 120 is allowed to restore the information extracted from the respective bands of 1 kHz, 2 kHz, etc., to original information on the basis of the restoration flag extracted from the band of 500 Hz.

FIG. 8 shows a configuration example of transmitting meta data on a spectrum on the side of the reproduction apparatus 110. For example, the time signal of meta data output from the meta data encode unit 113 is transformed into a frequency signal by a FFT (Fast Fourier Transform) unit 801, and a restoration flag is set at a prescribed band (500 kHz in the above example) on a frequency axis. Then, the frequency signal is restored to the time signal by an IFFT unit 802, and the time signal is transmitted to a prescribed channel in the transmission path 150.

Further, FIG. 9 shows a configuration example of receiving meta data transmitted on a spectrum on the side of the processing apparatus 120.

When a signal received from a sound channel allocated to the transmission of meta data is transformed into a frequency signal by a FFT unit 901, restoration flags and meta data are extracted from the respective bands of the frequency signal and transmitted to the meta data decode unit 122.

INDUSTRIAL APPLICABILITY

As described above, restoration flags are put when meta data is transmitted using a sound channel, whereby the processing apparatus 120 is allowed to restore original information using the restoration flags even if a gain is changed halfway.

The technology disclosed in the present specification is described in detail above with reference to the specific embodiment. However, it is obvious that persons skilled in the art could correct or replace the embodiment without departing from the spirit of the technology disclosed in the present specification.

The present specification describes the embodiment that realizes the technology disclosed in the present specification using a MADI interface. However, the technology disclosed in the present specification may be realized similarly even by other interface standards including a plurality of sound channels.

Further, the present specification describes the embodiment in which position information for each of objects is transmitted as meta data that has to have isochronism with sound data. However, the technology disclosed in the present specification may be applied similarly even in a case in which other meta data is transmitted. For example, besides position information regarding objects, parameters such as area information for specifying the specific areas of objects, frequencies or gains used in an effector such as waveform equalization, and attack times may be transmitted as meta data while being synchronized with sound data.

In short, the technology disclosed in the present specification is described as a mode of an example, and the described content of the present specification should not be interpreted in a limited way. In order to determine the spirit of the technology disclosed in the present specification, reference should be made to claims.

Note that the technology disclosed in the present specification may also employ the following configurations.

(1) A transmission apparatus including:

a first transmission unit that transmits sound data to a first sound channel in a transmission path; and a second transmission unit that transmits meta data related to the sound data to a second sound channel in the transmission path while ensuring synchronization with the sound data.

(1-1) A transmission method including:

performing a first transmission of sound data to a first sound channel in a transmission path; and performing a second transmission of meta data related to the sound data to a second sound channel in the transmission path while ensuring synchronization with the sound data.

(2) The transmission apparatus according to (1), further including:

a first reproduction unit that reproduces the sound data; and a second reproduction unit that offers the meta data in accordance with a time of the sound data or reproduces the meta data in accordance with a time as registered in advance.

(3) The transmission apparatus according to (1) or (2), in which the meta data includes position information regarding a sound source of the sound data.

(4) The transmission apparatus according to any of (1) to (3), in which the meta data includes at least one of area information for specifying a specific area of a sound source of the sound data, a frequency or a gain used in waveform equalization or other effectors, or an attack time.

(5) The transmission apparatus according to any of (1) to (4), in which the second transmission unit puts the meta data on respective sample amplitudes.

(6) The transmission apparatus according to (5), in which the second transmission unit puts a plurality of the meta data on respective samples in an order determined in advance.

(7) The transmission apparatus according to (5) or (6), in which the second transmission unit transmits the meta data with a restoration flag added for each piece of information, the restoration flag having a known amplitude.

(8) The transmission apparatus according to any of (1) to (4), in which the second transmission unit puts the meta data on a spectrum.

(9) The transmission apparatus according to (8), in which the second transmission unit transmits the meta data with a restoration flag at a prescribed band.

(10) A reception apparatus including:

a first reception unit that receives sound data from a first sound channel in a transmission path; and a second reception unit that receives meta data synchronized with the sound data from a second sound channel in the transmission path.

(10-1) A reception method including:

performing a first reception of sound data from a first sound channel in a transmission path; and performing a second reception of meta data synchronized with the sound data from a second sound channel in the transmission path.

(11) The reception apparatus according to (10), further including:

a processing unit that processes the sound data using the synchronized meta data.

(12) The reception apparatus according to (11), in which the meta data includes position information regarding a sound source of the sound data, and the processing unit performs sound field reproduction processing with respect to the sound data using the position information.

(13) The reception apparatus according to any of (10) to (12), in which the meta data includes a restoration flag, and the second reception unit restores the meta data from a reception signal of the second sound channel using the restoration flag.

(14) An acoustic system including:

a transmission apparatus that transmits sound data to a first sound channel in a transmission path and transmits meta data related to the sound data to a second sound channel in the transmission path while ensuring synchronization with the sound data; and a reception apparatus that receives the sound data from the first sound channel, receives the meta data synchronized with the sound data from the second sound channel, and processes the sound data using the meta data.

(15) The acoustic system according to (14), further including:

a plurality of the reception apparatuses; and a branch apparatus that distributes transmission signals of respective sound channels in the transmission path to the respective reception apparatuses.

(16) The acoustic system according to (14) or (15), in which the meta data includes position information regarding a sound source of the sound data, and the reception apparatus performs sound field reproduction processing with respect to the sound data using the position information.

(17) The acoustic system according to any of (14) to (16), in which the transmission apparatus transmits the meta data with a restoration flag, and the reception apparatus restores the meta data from a reception signal of the second sound channel using the restoration flag.

REFERENCE SIGNS LIST

100 Acoustic system
110 Reproduction apparatus
111 Sound data reproduction unit
112 Meta data reproduction unit
113 Meta data encode unit
120 Processing apparatus
121 Sound data processing unit
122 Meta data decode unit
130 Speaker
150 Transmission path
151 Sound channel (for transmission of sound data)
152 Sound channel (for transmission of meta data)
400 Acoustic system
410 Reproduction apparatus
421 to 423 Processing apparatus
431 to 433 Speaker
440 Branch apparatus
450 Transmission path

The invention claimed is:

1. A transmission apparatus comprising:

a first transmission unit that transmits sound data to a first sound channel in a transmission path; and a second transmission unit that transmits meta data related to the sound data to a second sound channel in the transmission path while ensuring synchronization with the sound data.

2. The transmission apparatus according to claim 1, further comprising:

a first reproduction unit that reproduces the sound data; and a second reproduction unit that offers the meta data in accordance with a time of the sound data or reproduces the meta data in accordance with a time as registered in advance.

3. The transmission apparatus according to claim 1, wherein the meta data includes position information regarding a sound source of the sound data.

4. The transmission apparatus according to claim 1, wherein the meta data includes at least one of area information for specifying a specific area of a sound source of the sound data, a frequency or a gain used in waveform equalization or other effectors, or an attack time.

5. The transmission apparatus according to claim 1, wherein the second transmission unit puts the meta data on respective sample amplitudes.

6. The transmission apparatus according to claim 5, wherein the second transmission unit puts a plurality of the meta data on respective samples in an order determined in advance.

7. The transmission apparatus according to claim 5, wherein the second transmission unit transmits the meta data with a restoration flag added for each piece of information, the restoration flag having a known amplitude.

8. The transmission apparatus according to claim 1, wherein the second transmission unit puts the meta data on a spectrum.

9. The transmission apparatus according to claim 8, wherein the second transmission unit transmits the meta data with a restoration flag at a prescribed band.

10. A reception apparatus comprising:

a first reception unit that receives sound data from a first sound channel in a transmission path; and a second reception unit that receives meta data synchronized with the sound data from a second sound channel in the transmission path.

11. The reception apparatus according to claim 10, further comprising:

a processing unit that processes the sound data using the synchronized meta data.

12. The reception apparatus according to claim 11, wherein the meta data includes position information regarding a sound source of the sound data, and the processing unit performs sound field reproduction processing with respect to the sound data using the position information.

13. The reception apparatus according to claim 10, wherein the meta data includes a restoration flag, and the second reception unit restores the meta data from a reception signal of the second sound channel using the restoration flag.

14. An acoustic system comprising:

a transmission apparatus that transmits sound data to a first sound channel in a transmission path and transmits meta data related to the sound data to a second sound channel in the transmission path while ensuring synchronization with the sound data; and a reception apparatus that receives the sound data from the first sound channel, receives the meta data synchronized with the sound data from the second sound channel, and processes the sound data using the meta data.

15. The acoustic system according to claim 14, further comprising:

a plurality of the reception apparatuses; and a branch apparatus that distributes transmission signals of respective sound channels in the transmission path to the respective reception apparatuses.

16. A transmission apparatus comprising:

a memory storing program code, and a processor configured to execute the program code to perform operations comprising:

transmitting sound data to a first sound channel in a transmission path; and transmitting meta data related to the sound data to a second sound channel in the transmission path while ensuring synchronization with the sound data.

17. A reception apparatus comprising:

a memory storing program code, and a processor configured to execute the program code to perform operations comprising:

receiving sound data from a first sound channel in a transmission path; and receiving meta data synchronized with the sound data from a second sound channel in the transmission path.

* * * * *